(No Model.)

W. A. TAYLOR.
BACK PRESSURE VALVE.

No. 379,880. Patented Mar. 20, 1888.

Witnesses.
J. A. Rutherford.
Robert Emmett

Inventor.
Walter A. Taylor.
By James L. Norris
Atty.

UNITED STATES PATENT OFFICE.

WALTER ANDERSON TAYLOR, OF NEW ORLEANS, LOUISIANA.

BACK-PRESSURE VALVE.

SPECIFICATION forming part of Letters Patent No. 379,880, dated March 20, 1888.

Application filed November 25, 1887. Serial No. 256,131. (No model.)

*To all whom it may concern:*

Be it known that I, WALTER ANDERSON TAYLOR, a citizen of the United States, residing at New Orleans, in the parish of Orleans and State of Louisiana, have invented certain new and useful Improvements in Back-Pressure Valves; and I do hereby declare that the following is a full, clear, and exact description of the same, reference being had to the annexed drawings, making a part of this specification, and to the letters and figures of reference marked thereon.

The object of my invention is to produce a new and improved back-pressure valve to regulate the pressure of the exhaust-steam of steam-engines when the steam is used for juice-heaters, double or triple effects, and other purposes where a back-pressure is carried on the engine and a valve is required to regulate the pressure to a certain number of pounds, that may be varied by adjusting the valve. I attain this object by the mechanism illustrated in the accompanying drawings, in which—

Figure 1:
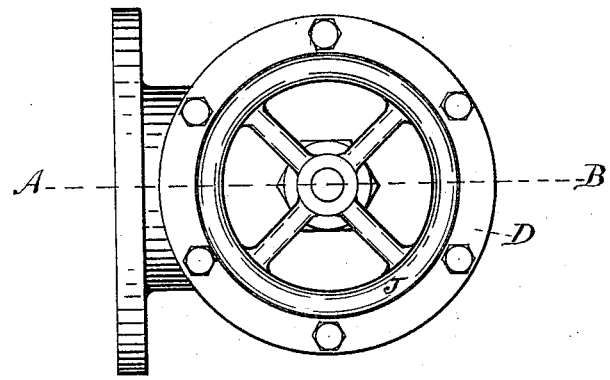
Figure 2:
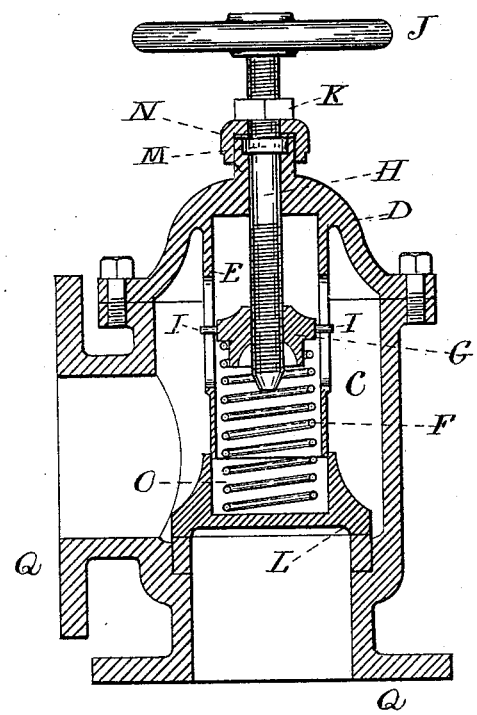

Figure 1 is a top view of the valve. Fig. 2 is a vertical section through line A B of Fig. 1.

Similar letters refer to similar parts in the several views.

The valve consists of a chamber, C, and a bonnet or cover, D, with a guide, E, cast on the cover D. The inside of the guide E is cored out to receive a spiral spring, F, which spring presses at one end on the cap or nut, G, which is tapped and screw-threaded and fits the adjusting-screw H. The nut G has at each side a dowel-pin, I, which slides up and down slots cast opposite each other in the guide E. This is to prevent the nut G turning when the adjusting-screw H is revolved. At J is a hand-wheel made fast on top of adjusting-screw H. At K is a jam-nut to jam the adjusting screw tight when spring F is set and to prevent it working loose when the valve L is working. The turning of the wheel J sets the valve L to any desired pressure as the spiral spring F is relaxed or compressed.

There is a collar at M, that fits into a recess or counterbore in cover D, and is held in place by a nut, N, screwed to top of the bonnet. This prevents the stem H from rising when adjusting the valve.

The valve is a flat-faced valve, as shown at L, and is simply a disk without any cross-bars, so that when it rises no obstruction is offered to the flow of steam. The upper part of valve has a recess at O, which slides up and down on lower part of guide E, and also receives the end of the spring F.

The valve-seat P is a brass ring driven into a bored recess in the chamber C. The chamber C may have flanges Q, or the joints may be screwed.

The whole combined parts make a neat, compact, and durable valve, and much more desirable than the style of lever and weight valve, against which there are some objections.

In my valve there are no stuffing-boxes to give trouble in packing and probably cause sticking.

What I claim, and desire to secure by Letters Patent, is—

A back-pressure valve consisting of the casing, the bonnet D, having the tubular guide E, the valve L, the spring F, the nut G, the screw H, having the collar M swiveled in a seat in the bonnet and provided with an attached external handle, and the nut N, for holding the swiveled collar in its seat, substantially as described.

In testimony whereof I have hereunto subscribed my name in the presence of two witnesses.

WALTER ANDERSON TAYLOR.

Witnesses:
FREDERIC COOK,
A. S. BECK.